United States Patent Office 2,711,658
Patented June 28, 1955

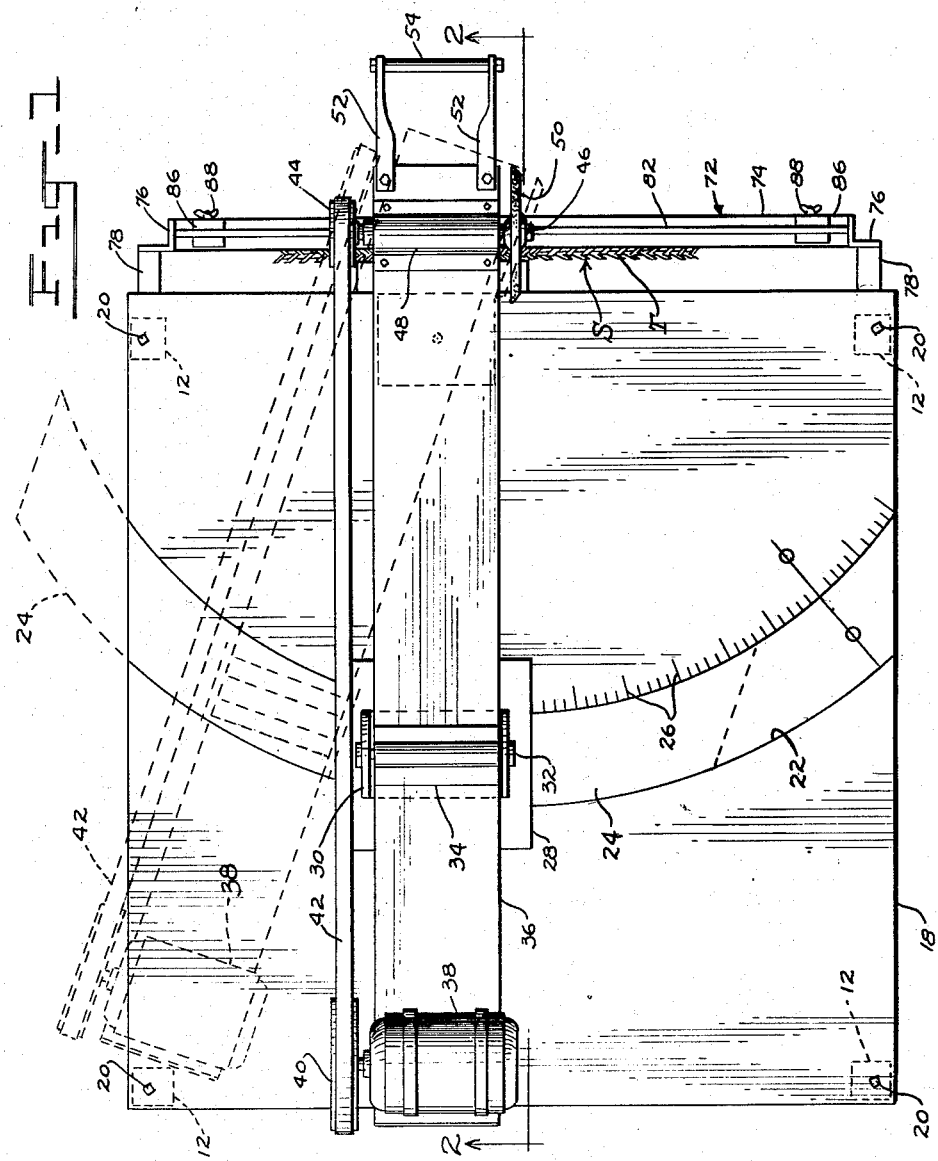

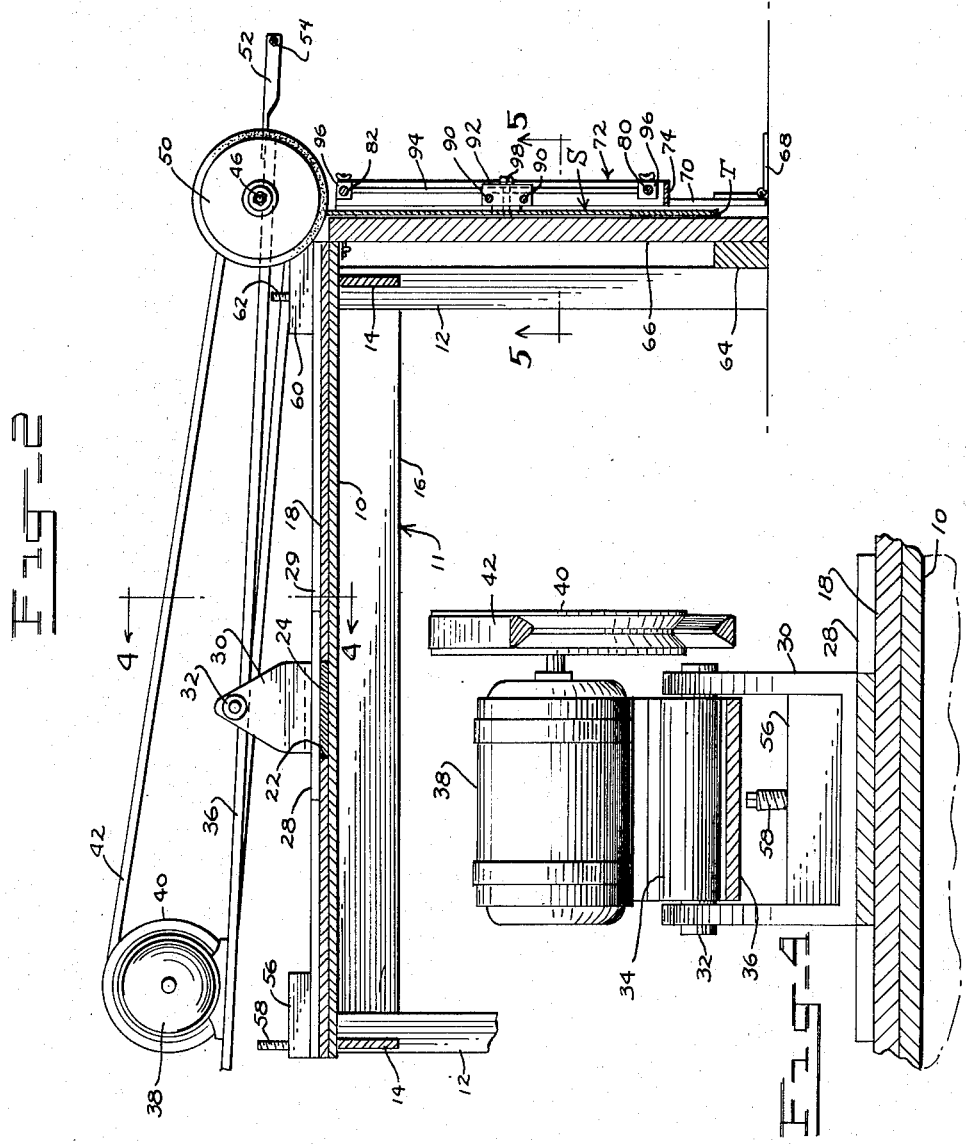

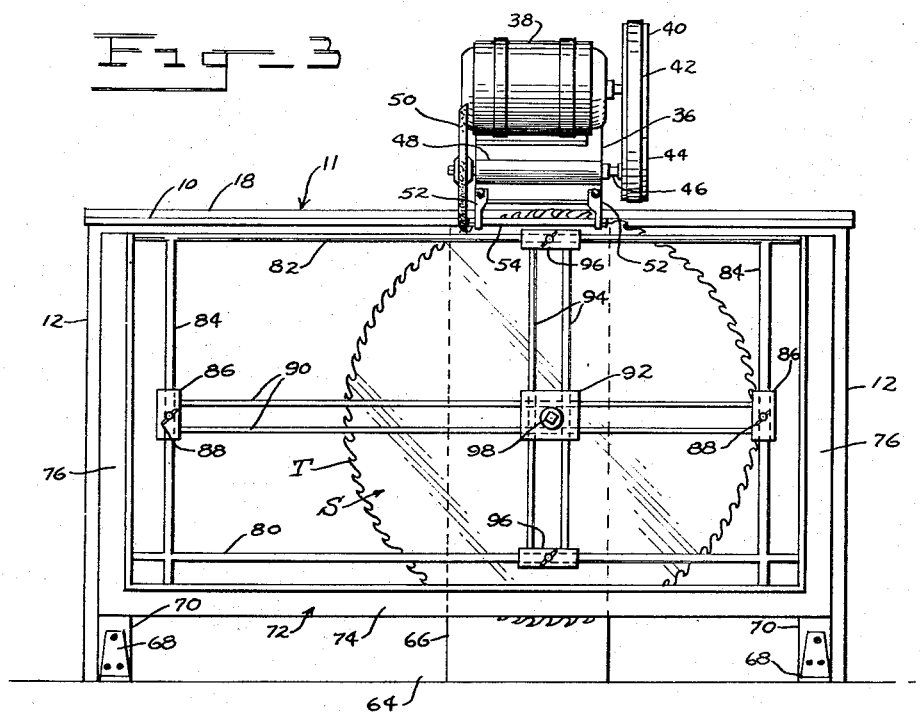
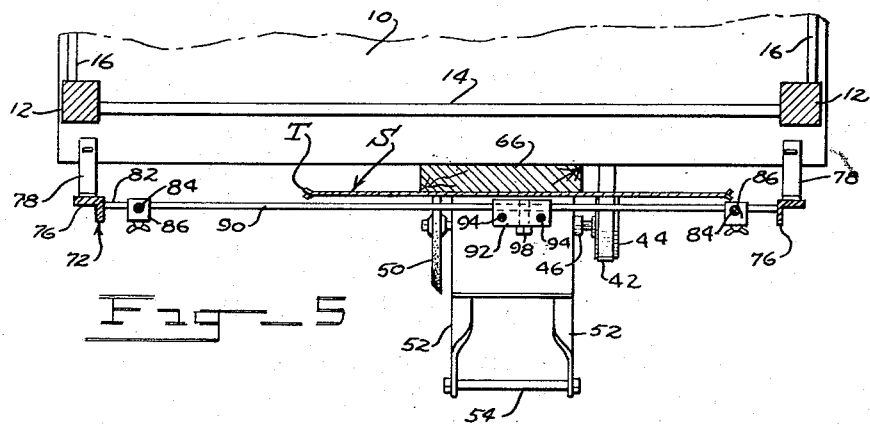
INVENTOR.
ARTHUR R. HUGGHINS

2,711,658

APPARATUS FOR GUMMING AND SHARPENING CIRCULAR SAWS

Arthur R. Hugghins, Waco, Tex.

Application September 9, 1952, Serial No. 308,540

2 Claims. (Cl. 76—79)

This invention relates to an apparatus for gumming and sharpening circular saws, in a single operation.

An important object of the present invention is to provide an apparatus of the character referred to in which the parts will be so arranged as to eliminate lost motion between the parts, thus to render the apparatus more accurate so far as gumming and sharpening of a circular saw is concerned.

Another object of importance is to provide a machine for sharpening circular saws in which means will be provided for making both horizontal and vertical adjustments of a bolt or arbor on which the circular saw is mounted, thus to adapt the machine for sharpening saws of different diameters, as well as to adapt the machine for selected positioning of the saw relative to a grinding wheel embodied in the apparatus.

Another object of importance is to provide a saw sharpening machine will be so designed as to permit the grinding wheel to be readily adjusted to selected, angular planes relative to the plane of the saw being sharpened, thus to allow sharpening of the saw teeth to selected transverse bevels.

Still another object of importance is to provide a saw sharpening machine in which there will be provided a pivotally mounted rocker beam on which the grinding wheel assembly is supported, said rocker beam ordinarily having free up and down movement, under the control of a user, to permit said user to adjust the grinding wheel upwardly and downwardly, out of and into engagement with the saw teeth, means being embodied in the apparatus for holding the rocker beam against pivotal movement whenever desired, thus to allow use of the apparatus as a stationary grinder.

Another object of importance is to provide a grinding or sharpening apparatus as described above, wherein the saw support assembly will be swingably mounted so as to be readily shifted to operative and inoperative positions, thereby to facilitate insertion or removal of a saw blade on which sharpening operations are to be performed, said saw support assembly in the operative position thereof being clampably engaged against a main support frame, to insure retention of the saw blade at a proper position relative to the grinding wheel.

Still another object of importance is to provide apparatus of the type stated which, while still being so designed as to achieve the desirable objects noted above, will yet be capable of manufacture at relatively low cost, will be substantially trouble free in operation over an indefinite period of time, and will comprise a minimum of parts simply arranged in a manner whereby they will not readily get out of order.

Other objects will appear from a consideration of the following description, the claims appended thereto, and from the annexed drawings, in which like reference characters designate like parts throughout the several views, and wherein:

Figure 1 is a top plan view of a saw sharpening machine formed in accordance with the present invention, the dotted lines showing one position to which the grinding wheel can be adjusted;

Figure 2 is a longitudinal sectional view taken substantially on line 2—2 of Figure 1;

Figure 3 is an end elevational view, taken from the right of Figure 2;

Figure 4 is an enlarged transverse sectional view taken on line 4—4 of Figure 2; and Figure 5 is a sectional view taken on line 5—5 of Figure 2.

Referring to the drawings in detail, the reference numeral 10 has been applied to the flat top of a support frame, said support frame being designated generally at 11. The support frame 11, in this connection, includes, at the several corners thereof, upstanding legs 12 braced transversely by cross members 14, and braced longitudinally by longitudinal brace members 16.

A bed plate has been designated by the reference numeral 18, and as shown in Figure 1, it is preferably rectangular in outer configuration, said bed plate in the illustrated embodiment of the invention being substantially coextensive in area with the flat top 10 of the support frame.

The bed plate 18 is removably but fixedly secured to the top 10 at its several corners, by bolts 20, and is disposed horizontally, during use of the apparatus.

Formed in the bed plate 18 is an arcuate guideway 22, said guideway extending through substantially ninety degrees of a circle, and opening at its opposite ends upon the opposite side edges of the bed plate.

Mounted in the arcuate guideway 22, for sliding movement, is a flat, elongated, arcuate slide plate 24.

The slide plate 24, in the full line position thereof shown in Figure 1, has its opposite end edges in registration with the side edges of the bed plate 18. However, the slide plate can be shifted to any of various positions, and to facilitate adjustment of the slide plate, graduations 26 are provided upon the bed plate, said graduations being disposed along one edge of the arcuate guideway 22.

Fixedly secured to the upper surface of the slide plate 24 is a bracket support plate 28, said bracket support plate 28 having its opposite ends projecting beyond the opposite side edges of the guideway 22, as shown in Figure 1. An elongated gauge block support plate 29 extends in opposite directions from the plate 28, toward the opposite ends of the bed plate 18, for a purpose to be made presently apparent, said gauge block support plate being shiftable with the bracket support plate 28 and slide plate 24 to selected positions, along the guideway 22.

Mounted upon the bracket support plate 28 is a U-shaped rocker beam support bracket 30, and extending between the upstanding legs of said bracket is a pivot shaft 32, said shaft 32 being elevated a substantial distance above the bight of the bracket, said bight being fixedly secured in any suitable manner to the upper surface of the bracket support plate 28.

Circumposed about the shaft 32, between the legs of the bracket 30, is a longitudinally flanged bearing sleeve, said sleeve being fixedly secured to the intermediate portion of an elongated, flat rocker beam 36. The sleeve, designated by the reference numeral 34, extends transversely of the rocker beam 36, thus to mount the rocker beam for pivotal movement upon the bracket 30 associated therewith.

In this way, the rocker beam can be adjusted bodily along the guideway 22, to any of various selected positions, the graduations 26 facilitating determination of said positions. For example, the rocker beam can be supported in one position in which it extends longitudinally of the frame, in parallelism with the longitudinal center line of the frame, this position being shown in full lines in Figure 1, in which position the longitudinal center adjusted to a position such as that shown in dotted lines in Figure 1, in which position the longitudinal center line of the rocker beam will be disposed obliquely to the longitudinal center line of the main support frame 11.

Mounted upon the rear end of the rocker beam 36 is a motor 38, said motor having a drive pulley 40 secured to the shaft thereof, about which is trained a drive belt 42 extending longitudinally of the rocker beam 36, along one side of the rocker beam. Drive belt 42 is trained about a driven pulley 44 secured to one end of a shaft 46 disposed transversely of the front end of the rocker beam, within a bearing 48 secured to said front end of the rocker beam.

To the other end of the shaft 46 is secured a grinding wheel 50, said grinding wheel being disposed beyond the opposite side of the rocker beam. As will be noted from Figure 1, the center of the grinding wheel is disposed at the center of the arcuate path along which the rocker beam is adjustable, this characteristic of the grinding wheel obtaining in each position to which the rocker beam is adjusted.

Securely fixedly to the front end of the rocker beam 36, and projecting forwardly from the rocker beam, are handle support bars 52, said bars supporting, at their outer ends, a handle 54. The handle 54 extends transversely of the rocker beam, between the handle support bars 52, and can be grasped by a user, for the purpose of swinging the front end of the rocker beam upwardly or downwardly, as desired.

It may be noted, in this connection, that the motor 38 is so placed as to normally overbalance the rocker beam, thus to cause the front end of the rocker beam, on which the grinding wheel is supported, to swing upwardly out of an operative position whenever the grinding wheel is not actually in use.

Normally, the rocker beam is freely swingable under the control of a user grasping the handle 54, about its horizontal pivot axis 32. However, if desired the rocker beam can be held against swingable movement, thus to permit use of the grinding wheel as a stationary grinder. The means which I have provided for holding the rocker beam against pivotal movement whenever desired includes a block 56 (Figure 2), mounted upon the rear end of the plate 29, said block 56 having a vertically disposed screw or bolt threadedly engaged therein. The bolt has been designated by the reference numeral 58, and when threaded upwardly against the underside of the rocker beam 36 will hold the rocker beam against pivotal movement.

At the front end of the plate 29, there is secured to said plate a depth adjustment block 60 having a screw 62 threaded therein, said screw 62 being threadable upwardly or downwardly to selected positions, to regulate the depth to which the grinding wheel 50 will cut when the front end of the rocker beam is swung downwardly during use of the apparatus.

A saw support assembly is embodied in the apparatus, for supporting a saw S to be sharpened in a vertical position below the grinding wheel 50. The saw support assembly has means to hold the saw S against movement beyond a vertical plane, in which the saw blade is illustrated in Figure 2. This means includes a base bar 64 extending transversely between the lower ends of the front supporting legs 12, said means further including an upstanding post 66 fixedly secured at its lower end to the intermediate portion of the base bar. The post 66 engages one face of the saw blade S, when the saw blade is disposed in proper position to be sharpened, and defines a back-up plate which will preclude movement of the saw blade beyond a desired, vertical plane in which it is to be located during the sharpening operation.

A pair of hinges 68 are adapted to be mounted upon a supporting surface, such as a floor, and provide a horizontal pivot axis at the floor level, about which a pair of plate-like brackets are swingable. The brackets have been designated by the reference numeral 70, each bracket being secured to one leaf of a hinge 68. In this way, the brackets 70 can be swung to one extreme position in which they are disposed vertically (see Figure 2), and alternatively, can be swung away from the post 66, to facilitate insertion or removal of a saw blade S, that is carried by a saw support frame designated generally by the reference numeral 72, during the sharpening operation. The saw support frame 72 is of flat, open formation, and is, in the illustrated embodiment of the invention, fashioned to a U shape with a horizontal bight 74 of angle iron material, and side legs 76 fixedly secured at their lower ends to the opposite ends of said bight. The side legs 76, when swung upwardly to a vertical position, are secured in said vertical position by latch members 78 carried by the frame 10, at the front corners of the frame.

Referring to Figure 3, I mount upon the side legs 76 an elongated, horizontal guide rod 80, said guide rod being fixedly secured at its opposite ends to the respective side legs 76 of the saw support frame 72, adjacent the lower ends of said side legs. An upper, horizontal guide rod 82 extends between the upper ends of the side legs 76, and is fixedly secured to said side legs.

A pair of vertical guide rods 84 is also provided, said guide rods 84 being fixedly secured at their upper ends to the opposite end portions of the upper horizontal guide rod 82. The vertical guide rods 84 are spaced inwardly short distances from the adjacent side legs 76, and are fixedly secured at their lower ends to the opposite end portions of the lower guide rod 80, as well as to the opposite end portions of bight 74.

Mounted for sliding movement upon the vertical guide rods 84 are guide blocks 86, said guide blocks 86 being fixedly connected to the rods 84 in selected positions of adjustment, by means of set screws 88.

Extending between and fixedly secured to the respective blocks 86 are horizontally disposed slide rails 90, it being thus apparent that the slide rails 90 can be adjusted bodily upwardly and downwardly with their associated blocks 86, upon the vertical guide rods 84.

Mounted to slide longitudinally of the slide rails 90 is an arbor support block 92, said block 92 having parallel bores receiving the rails 90.

The support block 92 also has a pair of transversely extended bores, receiving vertical slide rails 94, said rails 94 being fixedly secured at their respective ends to horizontally shiftable guide blocks 96 mounted for sliding movement upon the rods 80, 82 and clampable to said rods 80, 82 in any selected position to which they are adjusted longitudinally thereof.

It will be seen, from the construction illustrated and described, that the block 92 can be adjusted horizontally and vertically of its associated saw support frame 72, to any of a large number of positions.

Mounted upon the block 92, and disposed centrally upon the block, is a saw blade arbor or spindle 98, on which the saw blade S is positioned. The saw blade S is rotatable upon the spindle or arbor 98, and is held in each position to which it rotated by engagement against the post 66.

The adjustment of the block 92 permits the apparatus to be used in sharpening saw blades S of varying diameters, and further permits the saw blade to be accurately positioned, relative to the grinding wheel 50.

In use of the apparatus, the saw blade S is first mounted upon the arbor or spindle 98, after which the saw support frame 72 is swung upwardly upon hinges 68 to the position of the saw support frame illustrated in Figure 2. Thereafter, the rocker beam is angularly adjusted as desired, so as to dispose the grinding wheel 50 at a selected, angular plane relative to the plane of the saw blade S. In this way, when the front end of the rocker beam is swung downwardly during use of the device, the grinding wheel will be disposed effectively for grinding the saw teeth T at selected transverse bevels or angles.

The adjustment screw or stud 62, in this regard, is disposed in close proximity to the saw blade S, and can be utilized for varying the depth of cut, thus to cause the saw gullet to be cut to a previously and accurately determined depth.

After each tooth is sharpened, the saw sharpening or gumming operation can be continued, by rotating the saw blade S so as to position successively following teeth below the grinding wheel 50.

It will be apparent that an apparatus formed in accordance with the present invention is so designed as to permit saw sharpening or gumming to be carried out with ease and speed, without sacrificing accuracy in any way. The adjustments of the rocker beam, in this connection, are such as to eliminate lost motion, thus to insure the accurate positioning of the rocker beam in every instance, said accurate positioning of the rocker beam being in turn effective to locate the grinding wheel 50 at the proper position relative to the saw blade to be ground.

It is also thought to be an important characteristic of the invention that the construction is one which allows the accurate adjustment of the saw blade itself, this adjustment being permitted by means of the particular mounting of the saw blade support block 92 upon the frame 72.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A saw support assembly for a circular saw sharpening machine having saw blade sharpening means and a frame supported upon a plurality of legs; said assembly comprising a base bar extending between adjacent frame support legs and secured to the lower ends of said legs, a saw support frame hingedly mounted adjacent one end of said base bar for movement toward and away from said sharpening means, spaced parallel horizontally disposed guide rods and spaced parallel vertically disposed guide rods carried by said frame, a guide block slidably carried by each of said horizontal and vertical guide rods, a pair of spaced parallel horizontally disposed slide rails connected to and extending between said guide blocks on each of said vertical guide rods, a pair of spaced parallel vertically disposed slide rails connected to and extending between said guide blocks on each of the horizontal guide rods, an arbor support block slidably mounted upon both the vertical and horizontal slide rails for movement in intersecting rectangular paths, and an arbor carried by said block and extending outwardly therefrom upon which a circular saw blade to be sharpened may be rotatably mounted, said saw support frame being movable about its hinged mounting toward said sharpening means to a position wherein the saw blade teeth will be contacted by the sharpening means of said machine.

2. A saw support assembly for a circular saw sharpening machine having saw blade sharpening means and a frame supported upon a plurality of legs; said assembly comprising a base bar extending between adjacent frame support legs and secured to the lower ends of said legs, a saw support frame hingedly mounted adjacent one end of said base bar for movement in a vertical arcuate path toward and away from said sharpening means, a support block having an arbor extending outwardly therefrom upon which a saw blade to be sharpened can be rotatably mounted, means carried by said frame and operatively connected to said block for guiding said block in a rectilinear path in one direction, other means carried by the frame and operatively connected to said block for guiding the block in a rectilinear path in a direction transverse to said first-mentioned rectilinear path to thereby position said block in a selected position within said frame to position the teeth of the saw blade in desired relation with respect to the sharpening means, said saw blade support frame being movable about its hinged mounting toward said sharpening means to a position wherein the saw blade teeth will be contacted by said sharpening means in said desired relation thereto.

References Cited in the file of this patent

UNITED STATES PATENTS

| | | |
|---|---|---|
| 308,599 | Fawcett | Dec. 2, 1884 |
| 652,758 | Eicher | July 3, 1900 |
| 1,135,245 | Zuleg | Apr. 13, 1915 |
| 2,213,413 | Shaw | Sept. 3, 1940 |
| 2,470,290 | Chryst | May 17, 1949 |
| 2,479,978 | Smith | Aug. 23, 1949 |
| 2,507,371 | Eklund | May 9, 1950 |
| 2,519,748 | Duquette | Aug. 22, 1950 |
| 2,521,777 | Collis | Sept. 12, 1950 |
| 2,590,992 | McEwan | Apr. 1, 1952 |
| 2,607,243 | McEwan | Aug. 19, 1952 |